(12) United States Patent
Herbeck et al.

(10) Patent No.: US 7,895,155 B2
(45) Date of Patent: Feb. 22, 2011

(54) METHOD AND SYSTEM FOR UPDATING DOCUMENT CONTENT AND METADATA VIA PLUG-IN CHAINING IN A CONTENT MANAGEMENT SYSTEM

(75) Inventors: David Gerard Herbeck, Rochester, MN (US); John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 11/853,870

(22) Filed: Sep. 12, 2007

(65) Prior Publication Data

US 2009/0070288 A1    Mar. 12, 2009

(51) Int. Cl.
*G06F 7/00* (2006.01)
(52) U.S. Cl. .................... 707/610; 707/611; 707/620
(58) Field of Classification Search .............. 707/2, 707/610, 611, 620; 709/238
See application file for complete search history.

(56) References Cited

U.S. PATENT DOCUMENTS

2003/0182450 A1* 9/2003 Ong et al. ............ 709/246
2004/0068728 A1* 4/2004 Blevins ............... 718/100
2004/0205656 A1* 10/2004 Reulein et al. ........ 715/530

OTHER PUBLICATIONS http://officemicrosoft.com/en-us/products/HA10205815. aspx?mode=print, "Ecma Office Open XML File Formats Overview", pp. 1-2, printed Sep. 10, 2007.
http://en.wikipedia.org/wiki/Microsoft_Office_Open_XML, "Office Open XML", pp. 1-16, printed Sep. 10, 2007.
http://en.wikipedia.org/wiki/OpenDocument, "OpenDocument", pp. 1-6, printed Sep. 10, 2007.
http://www.dmdeveloper.com/articles/dfc/bof_practical.pf.html, "A Practical Guide to the Business Object Framework", pp. 1-13, printed Sep. 10, 2007.
Juan Rivero, Flatirons Solutions Consultant, "Customizing XML Application Behavior with Java and Type Based Business Objects (TBOs)—A Case Study", pp. 1-10.

* cited by examiner

*Primary Examiner*—Etienne P LeRoux
*Assistant Examiner*—Cindy Nguyen
(74) *Attorney, Agent, or Firm*—Patterson & Sheridan, LLP

(57) ABSTRACT

Embodiments of the invention provide a method for managing and updating documents containing specialized content in a content management system (CMS) by chaining plug-ins. Rather than create a unique rule for each specialized scenario, a CMS may be configured to apply a plug-in chain in an order based upon a type of document encountered and/or configured criteria.

12 Claims, 5 Drawing Sheets

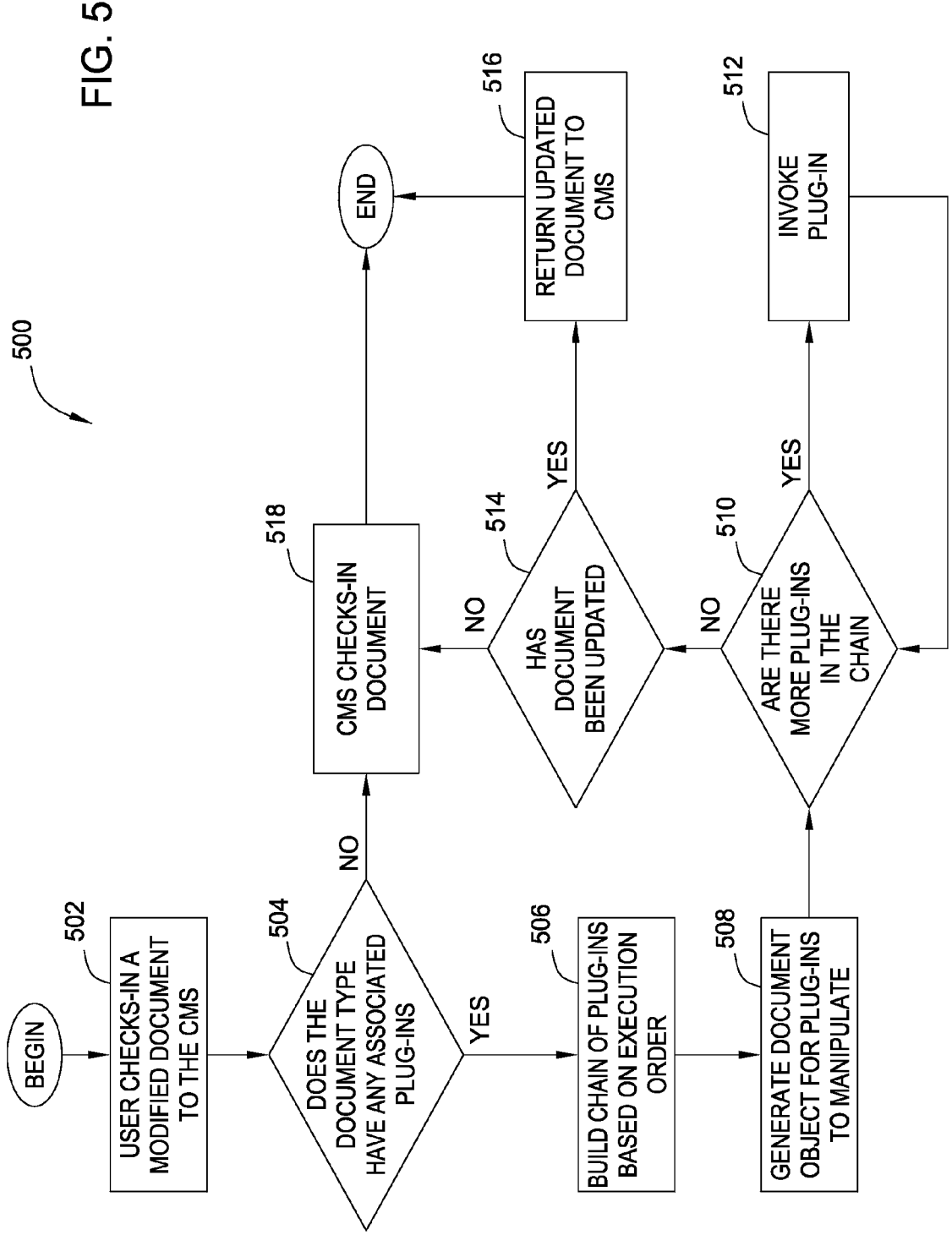

METHOD AND SYSTEM FOR UPDATING DOCUMENT CONTENT AND METADATA VIA PLUG-IN CHAINING IN A CONTENT MANAGEMENT SYSTEM

BACKGROUND OF THE INVENTION

1. Field of the Invention

Embodiments of the invention are generally related to managing a collection of data objects in a content management system. More specifically, embodiments of the invention are related to updating document content and metadata via plug-in chaining in a content management system.

2. Description of the Related Art

Content management systems (CMS) allow multiple users to share information. Generally, a CMS allows users to create, modify, archive, search, and remove data objects from an organized repository. The data objects managed by a CMS may include text documents, spreadsheets, database records, digital images, and digital video sequences, to name but a few (generically referred to as documents). A CMS typically includes tools for document publishing, format management, revision and/or access control, along with tools for document indexing, searching, and retrieval.

Some CMS systems use XML (extensible markup language) to manage content stored in the CMS repository. An XML-aware CMS may provide users with a variety of advantages, for example:

- structured authoring—the ability to incorporate metadata that is normally lost in conventional formats
- repurposing of data—the ability to share fragments of data or to transform the data into different formats
- publishing—the ability to have "single source publishing" using XML stylesheets (e.g. XSLT) that separate content from presentation
- interoperability—the ability to utilize XML data across different systems or applications
- intelligent storage—the ability to synchronize XML content with attributes in the CMS Thus, an XML aware CMS can manage XML content in powerful ways. Because of these, and other advantages, XML is growing in popularity as the preferred format for authoring, publishing, and storing a variety of documents and/or multimedia content.

Accordingly, there remains a need for methods and systems for updating document content and metadata via plug-in chaining in a CMS.

SUMMARY OF THE INVENTION

Embodiments of the invention provide a method for managing and updating specialized content in a content management system (CMS) by chaining plug-ins. One embodiment of the invention includes a method for processing a document managed by a CMS using plug-in chaining. The method includes receiving a request to process the document managed by the CMS, determining a document type associated with the document managed by the CMS, and based on the document type, determining a plug-in chain of one or more plug-ins to invoke for the document. The method also includes invoking a first plug-in in the plug-in chain, supplying the document as input to the first plug-in, and invoking, in an order specified by the plug-in chain, any subsequent plug-ins in the plug-in chain. The output of a given plug-in in the plug-in chain is passed as an input to a subsequent plug-in in the plug-in chain. After invoking each plug-in in the plug-in chain, an output of a last plug-in in the plug in chain is processed as specified by the request.

Another embodiment of the invention includes a computer-readable storage medium containing a program which, when executed, performs an operation for processing a document managed by a CMS using plug-in chaining. The operation may include receiving a request to process the document managed by the CMS, determining a document type associated with the document managed by the CMS, and based on the document type, determining a plug-in chain of one or more plug-ins to invoke for the document. The operation may also include invoking a first plug-in in the plug-in chain, supplying the document as input to the first plug-in, and invoking, in an order specified by the plug-in chain, any subsequent plug-ins in the plug-in chain. The output of a given plug-in in the plug-in chain is passed as input to a subsequent plug-in in the plug-in chain. After invoking each plug-in in the plug-in chain, the output of a last plug-in in the plug in chain is processed as specified by the request.

Still another embodiment of the invention includes a system having a processor and a memory containing a CMS configured to perform a method of processing a document managed by the CMS using plug-in chaining. The CMS may be configured to perform the steps of determining a document type associated with the document managed by the CMS, and based on the document type, determining a plug-in chain of one or more plug-ins to invoke for the document. The steps may also include invoking a first plug-in in the plug-in chain, supplying the document as input to the first plug-in, and invoking, in an order specified by the plug-in chain, any subsequent plug-ins in the plug-in chain. The output of a given plug-in in the plug-in chain is passed as input to a subsequent plug-in in the plug-in chain. After invoking each plug-in in the plug-in chain, an output of a last plug-in in the plug in chain is processed as specified by the request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is a flow diagram illustrating a method for checking-in a document to the CMS, according to one embodiment of the invention.

DETAILED DESCRIPTION OF THE PREFERRED EMBODIMENTS

Figure 1:
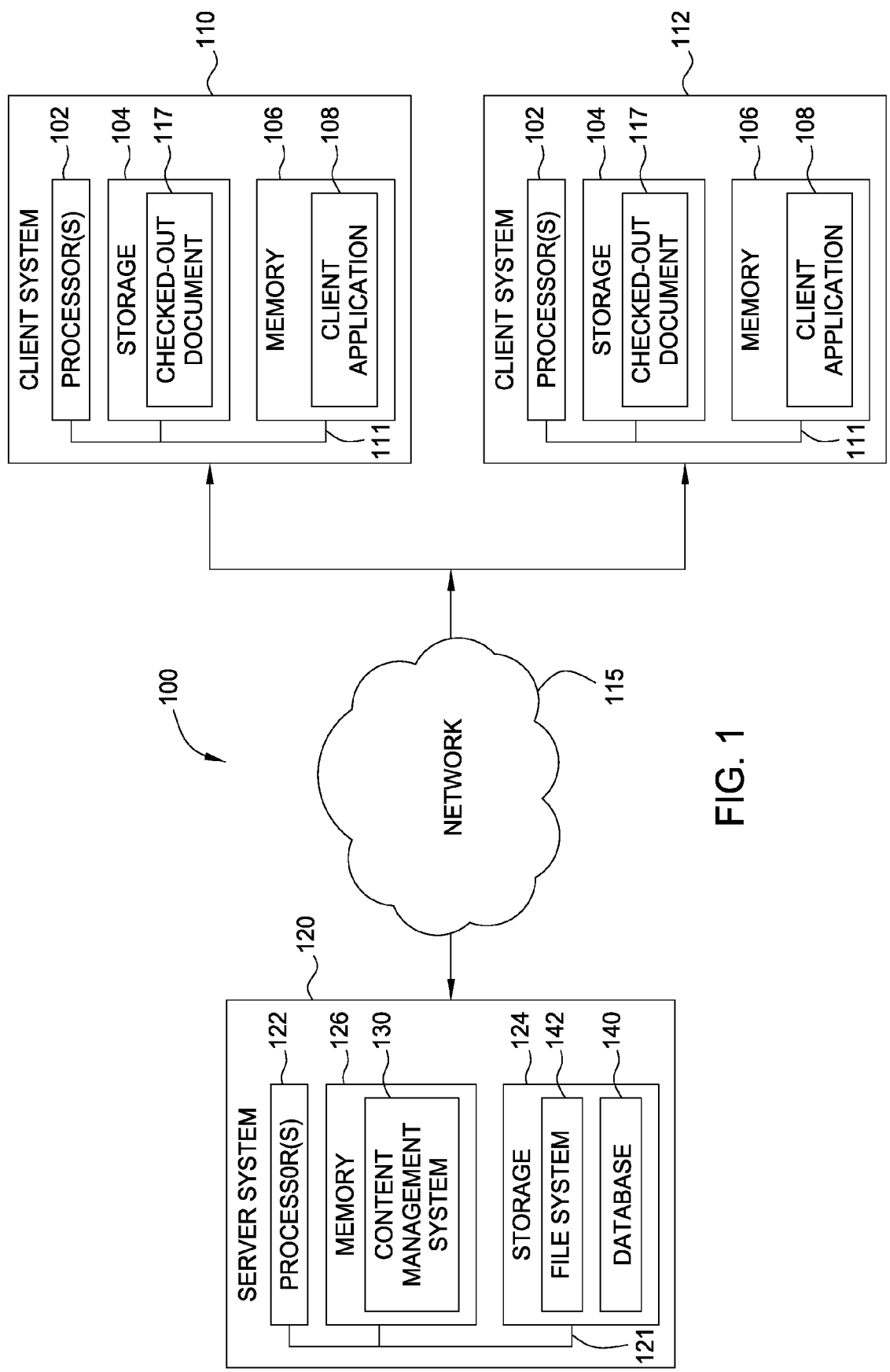
FIG. 1 is a block diagram illustrating a computing environment and content management system (CMS), according to one embodiment of the invention.

Embodiments of the invention provide a method for managing and updating specialized content in a content management system (CMS) by chaining plug-ins. Rather than create a unique rule for each specialized scenario, a CMS may be configured to apply a series of plug-ins in a particular order based upon the type of document encountered.

To support advanced XML data management, a CMS may employ extra processing rules governing content that flows into or out of a repository (a collection of documents managed by the CMS). These rules may include rules for synchronizing XML content (e.g., element or attribute values) and CMS document metadata. For example, a synchronization rule might be defined that specifies that whenever a document attribute maintained by the CMS is changed (e.g., a document version), a corresponding portion of the document should be automatically updated with that attribute's value (e.g., an XML attribute or element tag). Such a rule ensures that document content and CMS attributes are consistently synchronized with one another.

While this technique allows CMS attributes and document metadata to remain consistent between a given document and the CMS itself, current CMS applications take a narrow approach to XML content rule processing. Namely, the CMS encapsulates rule processing at a very low level in the application; therefore, the actual processing of the rules cannot be extended or built upon. Such an approach fails to address situations in which specialized content requires operations that are outside the scope of what may be accomplished by the available processing rules.

For example, an application may use a format to represent a document which is not easily handled by, or recognizable to, a CMS. Standard XML content is frequently wrapped within an alternative format. For example, the actual XML content of a document may be compressed as a "zip file" that contains several embedded XML documents that make up the single, whole "document". Whatever rules may apply to the XML content, such as synchronization rules, may never be processed due to the standard XML content being contained within a compressed format. Creating an individual specialized rule for each specialized situation a CMS may encounter would be far too cumbersome and inefficient. Nevertheless, it would be extremely beneficial to be able to process these documents in the same way as traditional XML content (i.e., the existing rule processing would not have to be rewritten).

Another example is that of a user working with the FDA's Structured Product Labeling (SPL) grammar. Since documents of this type contain XML content, users would like to process them with their standard CMS rules. Thus, the CMS would do the work of applying the standard XML content processing rules that happened to be defined for the SPL document type, and perform any updating of content and/or CMS metadata as necessary. However, since these documents may also be edited using a specialized client editor configured to recognize and process SPL content, it would be useful to perform document processing based on the SPL grammar. For example, it may, in the appropriate case, be useful to perform document transformations or to insert instructions or special attributes (relevant to the SPL document editor) into the content before passing it back to the application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Embodiments of the invention described herein are adapted for use with the widely used XML markup language. Accordingly, references to data objects, documents, and XML documents generally refers to data marked up using a well-formed collection of XML tags, elements and/or attributes. As is known, an XML grammar may be used to describe virtually any type of data. For example, XML grammars have been used to describe word processing documents, spreadsheets, database records, digital images and digital video, to name but a few. Further, specialized grammars are frequently specified for use with a domain specific XML schema (e.g., the eCTD XML schemas). An XML schema may be used to describe domain-specific data objects, such as rules regarding the structure, content, attributes, or semantics of a particular document type. However, the invention is not limited to the XML markup language, XML schemas, and the use of XML documents; rather, embodiments of the invention may be adapted to other markup languages, data object formats or data representations, whether now known or later developed.

FIG. 1 is a block diagram that illustrates a client/server view of a computing environment 100, according to one embodiment of the invention. As shown, computing environment 100 includes two client computer systems 110 and 112 communicating with a server system 120 over a network 115. The computer systems 110, 112, and 120 illustrated in environment 100 are included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer systems 110, 112, and 120 are simplified to highlight aspects of the present invention and that computing systems and networks typically include a variety of additional elements not shown in FIG. 1.

As shown, client computer systems 110 and 112 each include a CPU 102, storage 104, and memory 106 connected by a bus 111. CPU 102 is a programmable logic device that performs all the instructions, logic and mathematical processing performed in executing user applications (e.g., a client application 108). Storage 104 stores application programs and data for use by client computer systems 110 and 112. Typical storage devices 104 include hard-disk drives, flash memory devices, optical media and the like. Additionally, the processing activity and access to hardware resources made by client application 108 may be coordinated by an operating system (not shown). Well-known examples of operating systems include the Windows® operating system, distributions of the Linux® operating system, among others. (Linux is a trademark of Linus Torvalds in the US, other countries, or both). Network 115 represents any kind of data communications network, including both wired and wireless networks. Accordingly, network 115 is representative of both local and wide area networks, including the Internet.

Illustratively, memory 106 of client computer systems 110 and 112 includes a client application 108. In one embodiment, client application 108 is a software application that allows end users to retrieve and edit data objects stored in a content management system (CMS) 130. Thus, client application 108 may be configured to allow users to create, edit, and save a data object, e.g., word-processing documents, spreadsheets, database records, digital images or video data objects, to name but a few (collectively referred to as "documents"). In one embodiment, client application 108 may be configured to receive a document 117 from CMS 130 and store it in storage 104 while it is being accessed by client application 108. Further, client application 108 may be used to access documents stored in a format not easily handled by, or recognizable to, CMS 130. For example, checked-out document 117 may be a file used to store compressed versions of multiple XML documents. In such a case, client application 108 may be configured to decompress the individual XML documents and format and render the content of checked-out document 117 in an appropriate form. In another case, client application 108 may be specialized for a particular document grammar. For example, client application 108 may be configured to process the specialized grammar.

As stated, documents accessed from CMS 130 may be marked up using XML elements to describe the underlying data contained within the document for use with a particular client application 108, relative to an associated XML schema. Additionally, in one embodiment, a set of content plug-ins may be defined for a particular document type, and whenever a document of that type flows into or out of the repository, the plug-ins may be used to manipulate the document in whatever way is necessary for the document type. Some plug-ins may be directed toward converting the format of a document, while others may be directed toward altering the content of a document. Additionally, when a new document is created, the CMS may be configured to automatically identify the document type. Thereafter, anytime a user or CMS 130 accesses the document, the appropriate suite of plug-ins is invoked in the proper order of execution based on the document type configuration.

As shown, server system 120 includes a CPU 122, CMS storage repository 124, and a memory 126 connected by a bus 121. CMS repository 124 may include a database 140 and file system 142. File system 142 typically provides access to a directory structure contained on a disk drive or network file system and may be used to store files (e.g., documents managed by CMS 130). Database 140 may contain additional information and metadata related to documents stored in file system 142. Memory 126 of server system 120 includes CMS 130. As stated, CMS 130 may provide an application program configured for creating, modifying, archiving, and removing content managed by CMS 130. Thus, CMS 130 may include tools used for publishing, format management, revision and/or access control, content indexing, and facilities for performing searches and other operations related to documents managed by CMS 130.

Figure 2:
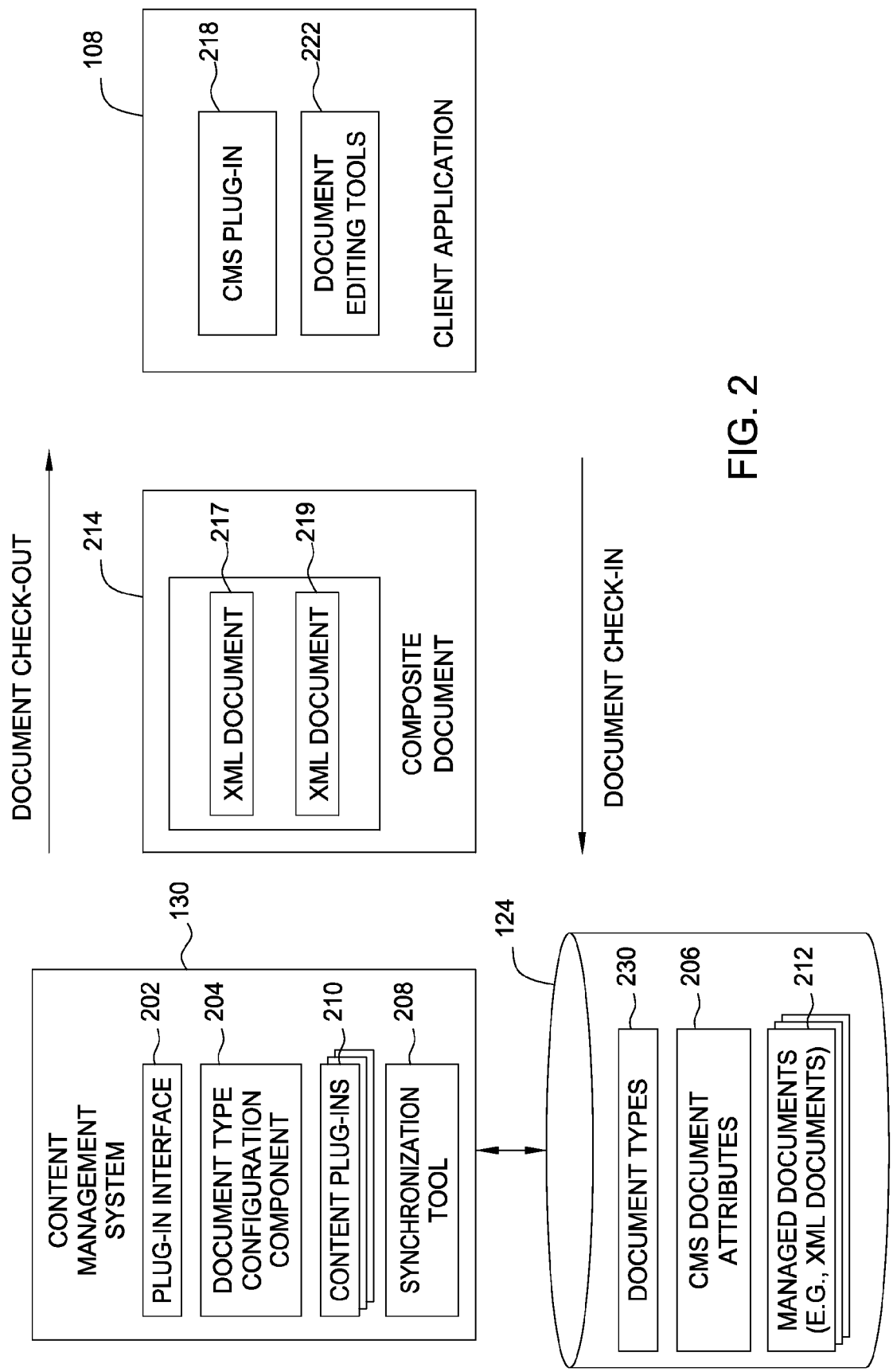
FIG. 2 is a block diagram illustrating a client application used to access data objects from a CMS, according to one embodiment of the invention.

FIG. 2 is a block diagram illustrating client application 108 being used to access a document 214 from CMS 130, according to one embodiment of the invention. As shown, CMS 130 includes a plug-in interface 202, a document type configuration component 204, content plug-ins 210 and a synchronization tool 208. Those skilled in the art will recognize that CMS 130 illustrated in FIG. 2 is simplified to highlight aspects of the present invention and that CMS systems typically include a variety of additional elements not shown in FIG. 2.

Generally, plug-in interface 202 provides a programmatic interface for a developer to implement content plug-ins 210. For example, plug-in interface 202 may define an API used by a developer to build a plug-in 210 for a given document type 230. In one embodiment, each content plug-in 210 implements the plug-in interface 202. Thus, the plug-in interface 202 allows the content plug-ins 210 defined for a particular document type to interact with document 212 in a consistent manner. Further, by implementing plug-in interface 202 for a particular document type, CMS 130 may invoke methods of the implemented API when a document of that type is checked-in or checked-out from CMS 130.

In one embodiment, document type configuration component 204 may specify which plug-ins 210 to invoke for a particular document type 230 along with the proper sequence of execution for the plug-ins 210. When one of documents 212 is checked-in or checked-out from CMS 130, the CMS 130 may determine the appropriate chain of plug-ins 210 to invoke from the document type configuration component 204, based on the particular document type 230.

Content plug-ins 210 may perform any number of operations on documents with specialized content. In one embodiment, for example, CMS 130 may invoke a first plug-in 210 configured to decompress one of documents 212 so that CMS 130 may interpret the XML content of that document 212. CMS 130 may then apply a set of processing rules to the decompressed content (e.g., synchronization rules, bursting rules, linking rules, etc). In another embodiment, the processing rules themselves may be encapsulated within a plug-in, thereby adding flexibility to the CMS 130. Subsequently, CMS 130 may invoke a second plug-in 210 to recompress document 212 before checking-out that document 212 to client application 108 (shown as composite document 214).

As another example, the second plug-in 210 could perform a transformation, or insert instructions or special attributes into the content before passing document 212 to client application 108 (shown as composite document 214). Thus, content plug-ins 210 may be used to extend the capabilities of the CMS 130 by allowing it to process documents with specialized content or formats or perform specialized functions or processing of the content of a given document 212.

Document types 230 may provide rules specifying what content plug-ins 210 are associated with a particular document type. Therefore, when CMS 130 accesses a document 212, the document type configuration component 204 can access the rules for the document type requested and determine the execution order for the appropriate content plug-ins.

CMS document attributes 206 refer to metadata that describe documents 212 managed by CMS 130. For example, attributes may maintain information such as a document ID, document version, author etc. In one embodiment, document attributes 206 may also specify what synchronization rules should be applied to a given document managed by the CMS.

FIG. 2 also shows composite document 214 being checked out/in from the CMS 130 for (or after) use by client application 108. In one embodiment, when a document flows into or out of repository 124, the CMS may be configured to invoke a chain of plug-ins to process composite document 214. As described, for example, a first plug-in could decompress composite document 214, allowing CMS 130 to access documents 217 and 219 for synchronization and any other CMS rule processing such as bursting or linking. Note, as mentioned above, in another embodiment rule processing could be encapsulated within a plug-in. Thereafter, a second plug-in could recompress documents 217 and 219 and store composite document 214 in CMS repository 124. Similarly, on document check-out, after any necessary plug-ins have been invoked (in the proper sequence), and after any synchronization actions are completed, CMS 130 may transmit composite document 214 to client application 108.

As shown, client application 108 includes CMS plug-in 218 and document editing tools 222. CMS plug-in 218 allows client application 108 to interact with CMS 130. For example, CMS plug-in 218 may allow a user interacting with client application 108 to check-in and check-out documents (e.g., composite document 214) from CMS 130. Document editing tools 222 provide the substantive features associated with a particular client application. For example, a word processing application may provide tools for specifying document presentation style, or a web-browser may be used to render, view and update the contents of XML documents 21 and 219 in composite document 214. Of course, depending on the function of client application 108, the exact features provided by document editing tools 222 will vary. Further, in another embodiment, client application 108 may provide a specialized application configured to interact with CMS 130. In such a case, CMS plug-in 218 may not be necessary for client application 108 to check-in and/or check-out documents from CMS repository 124.

Exemplary Document Check-in

Figure 3:
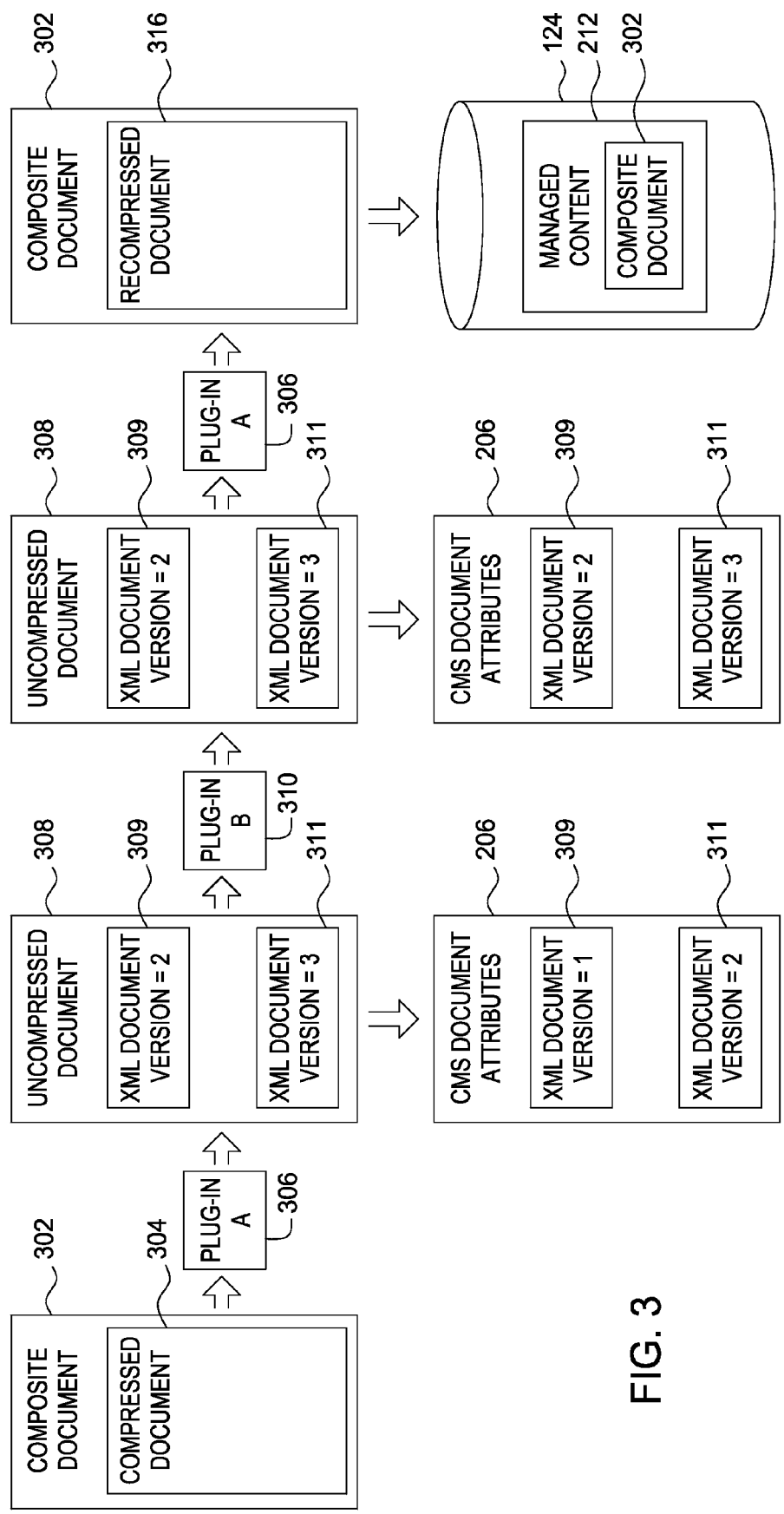
FIG. 3 illustrates a compressed document, associated plug-ins, and a result document, according to one embodiment of the invention.

FIG. 3 illustrates a document check-in procedure, according to one embodiment of the invention. As shown, FIG. 3 includes a composite document 302, an associated plug-in "A" 306, and an uncompressed document 308 generated from plug-in "A" being invoked on composite document 302. Composite document 302 may be a collection of documents 212, wrapped within compressed document 304. Illustratively, composite document 302 includes compressed document 304. As used herein, a compressed document generally refers to an alternative format for storing an XML document that would not normally be immediately recognizable by an XML editor. Upon determining a document type associated with document 302, CMS 130 may identify a chain of plug-ins 210 to invoke when documents of that type are checked-in. In this example, the CMS 130 first invokes the plug-in "A" 306 in order to uncompress document 302, allowing CMS 130 to access the XML documents 309, 311 contained therein.

FIG. 3 shows the then current CMS document attributes 206 associated with composite document 302 when document 302 is checked-in. At the time of check-in, plug-in "A" having uncompressed document 304, the version numbers of XML documents 309, 311 do not match the CMS documents attributes version numbers. FIG. 3 also shows a second plug-in 210 for this plug-in chain. Specifically, plug-in "B" 310 is invoked to synchronize CMS document attributes 206 with the updated content in XML documents 309, 311. That is, the CMS 130 determines that the next plug-in for this plug-in chain is plug-in "B" which synchronizes the updated attributes of XML documents 309, 311 with their corresponding CMS metadata, resulting in the updates to CMS document attributes 206.

FIG. 3 shows a composite document 302 generated from plug-in "A" being invoked on uncompressed document 308. Having synchronized the attributes, CMS 130 determines that the next (and final) plug-in 210 to be invoked in this plug-in chain is plug-in "A" 306 which recompresses document 308 into composite document 302. FIG. 3 also shows data repository 124 containing the composite document 302. Having invoked the entire chain of plug-ins, the CMS checks-in composite document 302 to the CMS document repository 124. Plug-ins "A" and "B", 306 and 310 respectively, may be two of the content plug-ins 210, and documents 302 and 308 represent the stages of a particular plug-in chain for the document type 230 of composite document 302. In this example, the output of one plug-in (e.g., uncompressed document 308 output by plug-in "A" 306) is used as the input to the next plug-in in the chain (e.g., uncompressed document 308 input to plug-in "B" 310).

Note, however, that the example of plug-in "A" 306 and plug-in "B" 310 used to decompress and process document 302 is just one example of a specialized situation in which chaining plug-ins would be beneficial in dealing with specialized content. Of course, one of skill in the art will recognize that plug-in chains may be used to extend the capabilities of the CMS in a variety of ways, allowing the CMS to deal with specialized content or perform specialized functions for (or processing of) different types of documents.

Process for Checking-out a Document

Figure 4:
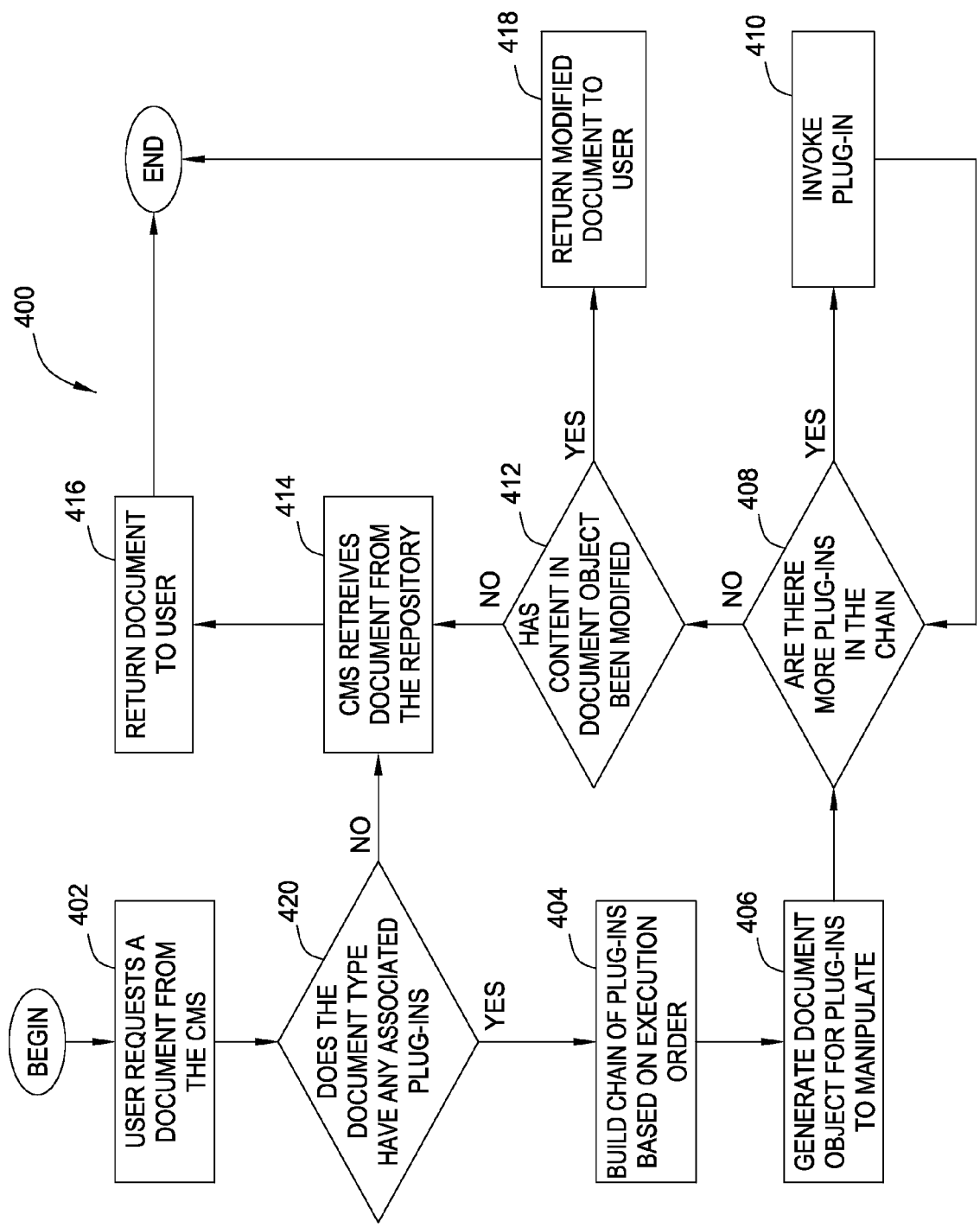
FIG. 4 is a flow diagram illustrating a method for checking-out a document from the CMS, according to one embodiment of the invention.

FIG. 4 is a flow diagram illustrating a document check-out process 400, according to one embodiment of the invention.

As shown, process 400 begins at step 402, when a user requests a document from the CMS.

At step 420, CMS 130 may determine, based on the document type configuration component 204, whether the requested document is of a type that has any associated content plug-ins 210. If no plug-ins are defined for the document type associated with the document requested at step 402, then, at step 414, the CMS 130 simply retrieves the document as-is from the repository 124 and returns the document to the user at step 416.

Otherwise, however, if one or more plug-ins are defined for the document type associated with the document requested at step 402, then, at step 404, the document type configuration component may determine, based on configured criteria (e.g. document attribute values), which content plug-ins apply and the proper execution order of the content plug-ins 210 associated with the requested document. In one embodiment, CMS 130 may build a chain of content plug-ins to be executed in sequence, where the output of one plug-in 210 is used as input to the next plug-in 210 in the chain. At step 406, CMS 130 then generates a document object for the content plug-ins 210 in the chain to manipulate. CMS 130 then passes the document object into a loop, first determining, at step 408, whether there are any remaining content plug-ins 210 in the chain. If the chain is complete, the process 400 proceeds to step 412.

If, however, at step 408, the CMS 130 determines that there are more plug-ins 210 in the chain, the next plug-in in the chain is invoked at step 410. The CMS 130 continues to pass the output from one plug-in 210 as input to the next and so on until the chain is complete, such that the resulting updated content and/or CMS metadata is produced from the collective processing of the entire plug-in chain. Further, it is conceivable that this process could build/generate other data (e.g. that might be associated with the document but not alter the document itself). For example, if a collection of documents was bundled and sent to a client during checkout. It is possible that the main document was not altered but an associated file (such as a schema or stylesheet) was generated/altered and included in the bundle. Once the entire chain has been invoked, process 400 proceeds to step 412, where the CMS 130 determines if the content of the document has been changed, or other data has been generated. If none of the plug-ins changed the content then the CMS retrieves the original content from the repository at step 414 and the original content is passed to the user at step 416.

If, however, at least one plug-in changed the content of the requested document, then process 400 proceeds to step 418, where CMS 130 returns the modified document to the user.

Process for Checking-in a Document

FIG. 5 is a flow diagram illustrating a document check-in process, according to one embodiment of the invention. Process 500 begins at step 502, when a user checks-in a document to the CMS 130.

At step 504, CMS 130 determines, based on the document type being checked-in, if the document being checked-in has any associated content plug-ins 210. If no plug-ins 210 are defined for the document type of the document being checked-in, then process 500 proceeds to step 518, where CMS 130 simply checks-in the document as-is into CMS repository 124.

Otherwise, however, if one or more plug-ins 210 are defined for the document type associated with the document being checked-in, then, at step 506, the document type configuration component may determine, based on configured criteria (e.g. document attribute values), which content plug-ins apply and the proper execution order of the content plug-ins 210, and CMS 130 builds a chain of content plug-ins to be executed in the appropriate sequence. At step 508, CMS 130 then generates a document object for the content plug-ins 210 in the chain to manipulate. CMS 130 then passes the document object into a loop, first determining, at step 510, whether there are any remaining content plug-ins 210 in the chain. If the chain is complete, the process 500 proceeds to step 514.

If, however, at step 510, CMS 130 determines that the chain of plug-ins has not been fully executed and there are more plug-ins in the chain, the next plug-in 210 in the chain is invoked at step 512. CMS 130 continues to pass the output from one plug-in 210 as input to the next and so on until the chain is complete, such that the resulting updated content and/or CMS metadata is produced from the collective processing of the entire plug-in chain. As noted above, it is conceivable that this process could build/generate other data. Once the entire chain has been invoked, process 500 proceeds to step 514, where the CMS 130 determines if the document has been changed. If none of the plug-ins changed the document then the CMS 130 checks-in the document to the repository at step 518.

If, however, at least one plug-in changed the document (modifying content or metadata), then process 500 proceeds to step 516, where the CMS 130 checks-in the updated document.

Advantageously, embodiments of the invention extend the functionality and capabilities of a CMS using plug-in chaining. Doing so allows a CMS to process content that the CMS would not recognize otherwise. By implementing a standard plug-in interface, the CMS may invoke methods of the implemented API when a document of that type is checked-in or checked-out from CMS 130.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a request to process a composite document managed by a content management system (CMS), the composite document comprising a plurality of compressed documents;
determining a document type associated with one or more of the plurality of compressed documents of the composite document;
determining a plug-in chain of one or more plug-ins to invoke for the composite document based on the document type;
invoking each plug-in in the plug-in chain, wherein invoking each plug-in in the plug-in chain comprises decompressing the plurality of compressed documents, synchronizing CMS metadata with corresponding metadata included in one or more of the plurality of compressed documents, and recompressing the plurality of compressed documents; and
after invoking each plug-in in the plug-in chain, processing an output of a last plug-in in the plug in chain as specified by the request.

2. The method of claim 1, wherein the request is to check-in the composite document to the CMS, and wherein the method further comprises checking-in the composite document to the CMS.

3. The method of claim 1, wherein the request is to check-out the composite document from the CMS, and wherein the method further comprises checking-out the composite document from the CMS.

4. The method of claim 1, wherein at least one of the plurality of compressed documents is an XML document composed according to a XML grammar, and wherein at least one plug-in in the plug-in chain is configured to process the XML document on the basis of the XML grammar.

5. A computer-readable storage medium containing a program which, when executed, performs an operation comprising:
- receiving a request to process a composite document managed by a content management system (CMS), the composite document comprising a plurality of compressed documents;
- determining a document type associated with one or more of the plurality of compressed documents of the composite document;
- determining a plug-in chain of one or more plug-ins to invoke for the composite document based on the document type;
- invoking each plug-in in the plug-in chain, wherein invoking each plug-in in the plug-in chain comprises decompressing the plurality of compressed documents, synchronizing CMS metadata with corresponding metadata included in one or more of the plurality of compressed documents, and recompressinq the plurality of compressed documents; and
- after invoking each plug-in in the plug-in chain, processing an output of a last plug-in in the plug in chain as specified by the request.

6. The computer-readable storage medium of claim 5, wherein the request is to check-in the composite document to the CMS, and wherein the operation further comprises checking-in the composite document to the CMS.

7. The computer-readable storage medium of claim 5, wherein the request is to check-out the composite document from the CMS, and wherein the operation further comprises checking-out the composite document from the CMS.

8. The computer-readable storage medium of claim 5, wherein at least one of the plurality of compressed documents is an XML document composed according to a XML grammar, and wherein at least one plug-in in the plug-in chain is configured to process the XML document on the basis of the XML grammar.

9. A system comprising:
- a processor; and
- a memory connected to the processor, the memory comprising a content management system (CMS) configured to perform a method comprising:
  - receiving a request to process a composite document managed by a content management system (CMS), the composite document comprising a plurality of compressed documents;
  - determining a document type associated with one or more of the plurality of compressed documents of the composite document;
  - determining a plug-in chain of one or more plug-ins to invoke for the composite document based on the document type;
  - invoking each plug-in in the plug-in chain, wherein invoking each plug-in in the plug-in chain comprises decompressing the plurality of compressed documents, synchronizing CMS metadata with corresponding metadata included in one or more of the plurality of compressed documents, and recompressing the plurality of compressed documents; and
  - after invoking each plug-in in the plug-in chain, processing an output of a last plug-in in the plug in chain as specified by the request.

10. The system of claim 9, wherein the request is to check-in the composite document to the CMS, and wherein the method further comprises checking-in the composite document to the CMS.

11. The system of claim 9, wherein the request is to check-out the composite document from the CMS, and wherein the method further comprises checking-out the composite document from the CMS.

12. The system of claim 9, wherein at least one of the plurality of compressed documents is an XML document composed according to a XML grammar, and wherein at least one plug-in in the plug-in chain is configured to process the XML document on the basis of the XML grammar.

* * * * *